Nov. 16, 1965

W. R. STEINER 3,218,111

REFRIGERATING APPARATUS

Filed Jan. 27, 1964

INVENTOR.
WILLIAM R. STEINER
BY
J. C. Evans
ATTORNEY

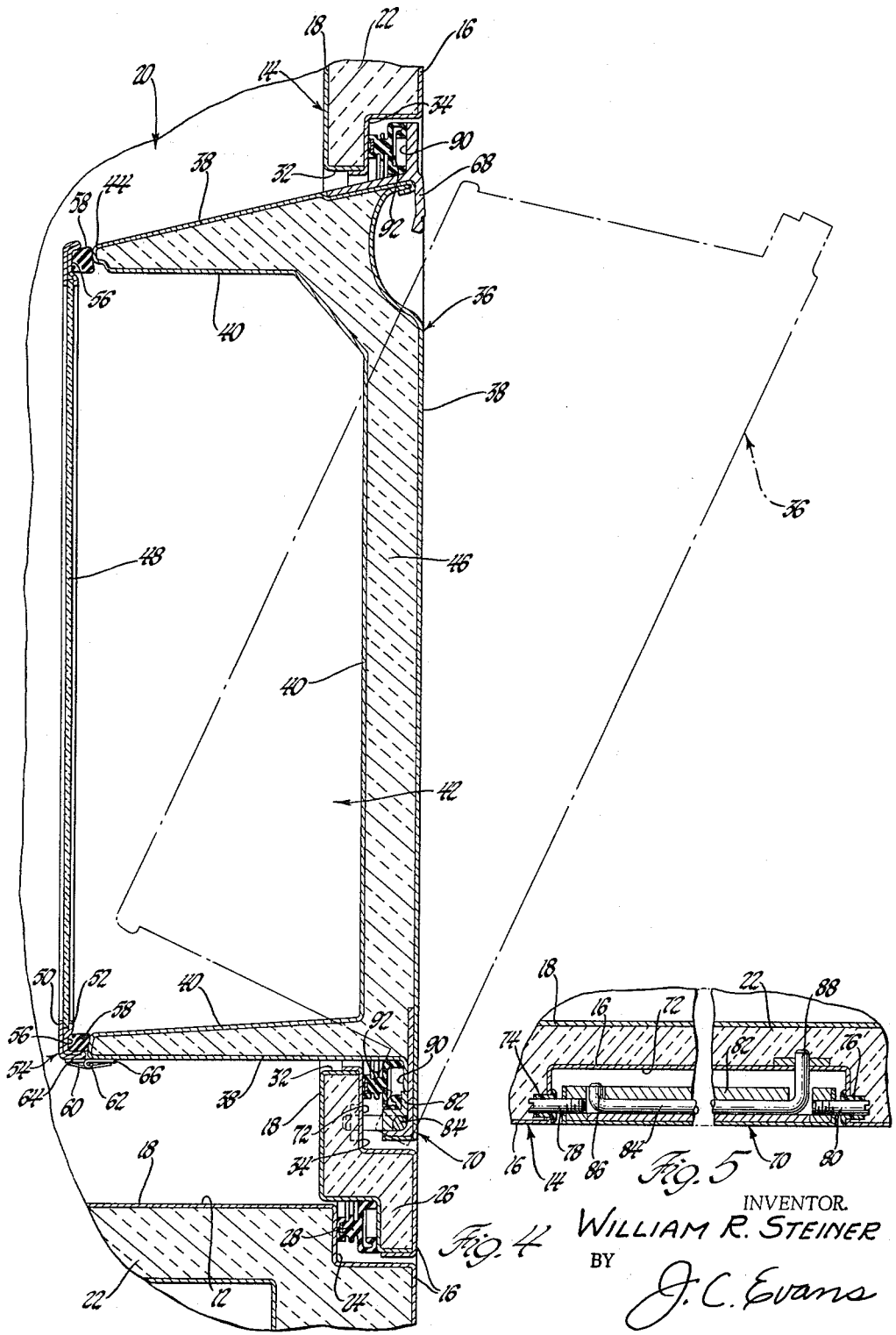

United States Patent Office 3,218,111
Patented Nov. 16, 1965

3,218,111
REFRIGERATING APPARATUS
William R. Steiner, Rochester, Mich., assignor to General Motors Corporation, Detroit, Mich., a corporation of Delaware
Filed Jan. 27, 1964, Ser. No. 340,264
5 Claims. (Cl. 312—214)

This invention relates to a refrigerating apparatus and more particularly to an improved, multiple food storage compartment arrangement in a refrigerator.

One problem with refrigerators including main food storage compartments and a separate higher humidity enclosure for fresh vegetables and the like is that the main refrigerator door is opened to gain access to the fresh food area with a consequent additional cooling being required to maintain the main food storage compartment at a predetermined desired temperature. Further, such higher humidity enclosures are usually door mounted or otherwise arranged within the refrigerator at a location which requires a user to stoop or bend to gain access thereto.

An object of the present invention, therefore, is to improve refrigerators having multiple food storage compartments by the provision of a separate, high-humidity enclosure accessible to a user without bending, stooping or opening the main door of the refrigerator.

A further object of the present invention is to improve such refrigerator arrangements by the provision of a separate, high-humidity enclosure mounted on the door for closing the main food storage compartment in the refrigerator with the high-humidity enclosure forming in conjunction with the main door a part of the thermal insulating section between the main food storage compartment and the outside air and wherein the separate high-humidity enclosure is movable outwardly of the main refrigerator door so as to be accessible without requiring opening of the main refrigerator door.

A further object of the present invention is to improve a refrigerator arrangement by the provision of a fixed food storage enclosure and a movable food storage enclosure arranged so that the interior of the fixed food storage enclosure is accessible through a cabinet opening closed by a door pivoted on a first axis and wherein the movable food storage enclosure is supported on the door for pivotal movement outwardly thereof when the door is in its closed position about an axis substantially perpendicular to the first axis into a horizontal plane whereby access interiorly of the movable food storage enclosure is obtained without requiring that the door to the fixed food storage enclosure be opened and whereby the interior space is eccessible without bending or stooping.

Further objects and advantages of the present invention will be apparent from the following description, reference being had to the accompanying drawings wherein a preferred embodiment of the present invention is clearly shown.

In the drawings:

FIGURE 4 is an enlarged view in vertical section taken along the line 4—4 of FIGURE 3; and FIGURE 5 is an enlarged, fragmentary view in horizontal section taken substantially along the line 5—5 of FIGURE 3.

Figure 1:
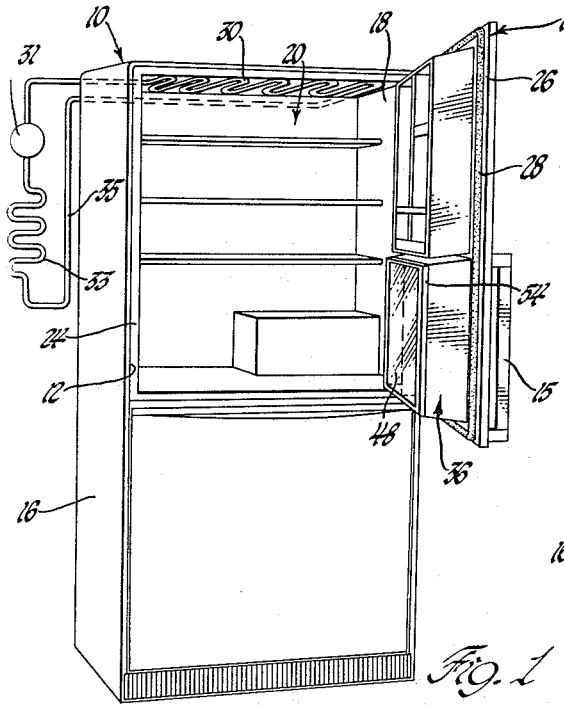
FIGURE 1 is a view in perspective of a refrigerator having the improved food storage compartment arrangement of the present invention.

Referring now to the drawings, in FIGURE 1, the present invention is illustrated in conjunction with a vertical refrigerator 10 of the type including a bottom freezer and an upper food storage section having an access opening 12 thereto closed by an upper door 14 having a handle 15, with it being understood that the present invention is suitable for association with other types of refrigerator cabinet arrangements, as, for example, an arrangement having an upper, separate freezer compartment, an arrangement where the freezer compartment is located within the space bounded by the main food storage compartment inner liner of a refrigerator, and an arrangement where there is no freezer compartment associated with the refrigerator.

The refrigerator 10 including the door 14 thereof, as best illustrated in FIGURE 4, includes an outer cabinet wall 16 and an inner liner 18 spaced therefrom to form the walls of a food storage compartment 20 accessible through the cabinet opening 12. Between outer wall 16 and inner liner 18 suitable thermal insulating material 22 is disposed to prevent excessive heat transfer between the compartment 20 and its surrounding environment. In the illustrated arrangement, the opening 12 is completely surrounded by a recessed lip 24 in the outer cabinet wall 16. The door 14 has an outwardly directed, continuous, peripheral flange 26 thereon that overlaps the recessed lip 24 in spaced relationship therewith when the door 14 is closed, as best seen in FIGURE 4. The flange 26 thereby serves as a supporting surface for a bellows-type seal 28 of a suitable resilient material that extends continuously around the peripheral flange 26 to sealingly engage the outwardly facing surface of the recessed lip 24 when the door 14 is closed so as to prevent convective interchange between food storage compartment 20 and the higher ambient temperatures exteriorly of cabinet 10.

In the illustrated embodiment of the invention the main food storage compartment 20 is maintained at a predetermined desired temperature by an evaporator 30 representatively illustrated as being in the top wall of the inner liner, as best illustrated in FIGURE 1, with it being understood that the evaporator 30 is arranged in refrigerant flow relationship with a suitable refrigeration system including motor compressor unit 31, condenser 33, and expansion means representatively shown as being an elongated small diameter tube 35.

Figure 2:
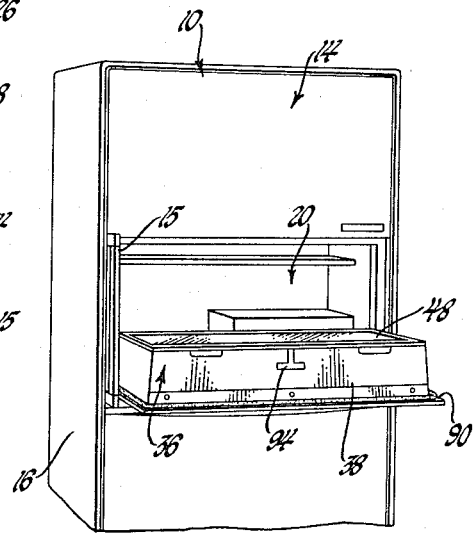
FIGURE 2 is a view in perspective of the arrangement of FIGURE 1, partially broken away, with the main door of the arrangement closed and the movable food storage compartment located exteriorly of the main door.
Figure 3:
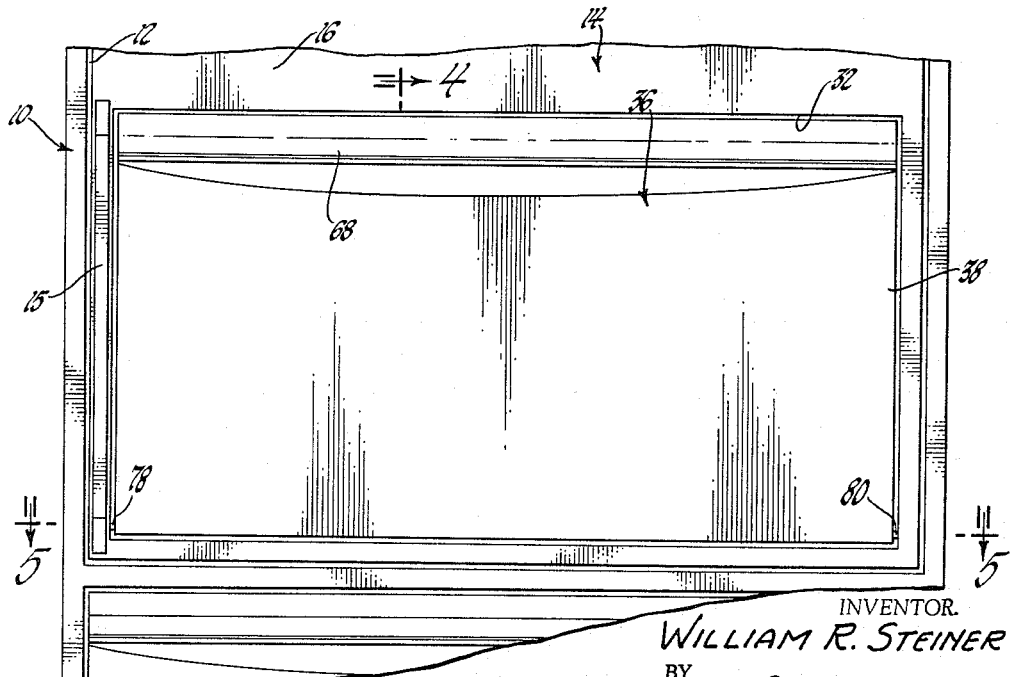
FIGURE 3 is an enlarged view in front elevation of a portion of the refrigerator showing the movable food storage compartment in its closed position.

The door 14 for closing the access opening 12 into the main food compartment 20 is mounted by suitable hinge means at one side thereof to the outer cabinet wall 16 for pivotal movement relative thereto into a closed and an open position as best illustrated in FIGURES 1 and 2 with the pivotal movement occurring about a substantially vertical axis.

In accordance with certain of the principles of the present invention, the door 14 has an opening 32 therethrough representatively shown as being of a generally rectangular shape and surrounded by a recessed lip 34 formed in the outer wall portion 16 of the upper door 14. Within the opening 32 is disposed a movable enclosure 36 including an outer housing or enclosure wall 38 and an inner liner 40 spaced from the outer wall 38 arranged to form the walls of a secondary food storage compartment 42 having an opening thereto formed by the juncture 44 between the inner liner 40 and the outer housing wall 38 at a point spaced inwardly of the inner liner 18 of door 14 when the movable enclosure 36 is in a closed position. Between the outer wall 38 and inner liner 40 of the housing 36 is disposed a layer of suitable thermal insulating material 46 for preventing convective heat transfer between the secondary food storage compartment and the exterior of the refrigerator cabinet 10.

In the illustrated embodiment of the invention the movable enclosure 36 has the access opening 44 thereto closed by a suitable closure panel 48 to thereby separate the secondary food compartment 42 from the main food storage compartment 20 and thus reduce convective interchange therebetween whereby fresh vegetables and the like can be stored in compartment 42 and maintained at a higher humidity than food in the main storage compartment 20. More specifically, the closure panel 48 in the illustrated embodiment of the invention has a planar area substantially equal to that of the access opening into food storage compartment space 42 and has the outer edge thereof supportingly received within spaced apart ends 50, 52 of a supporting bezel 54 that surrounds the access opening in overlying relationship with the juncture 44 between outer wall 38 and inner liner 40. The bezel 54 is continuously deformed at 56 to form a supporting surface for an annular seal 58 of a suitable resilient material that sealingly engages the opening forming wall juncture when the panel 48 is closed. A looped spring element 60 is wound around a horizontally directed pivot pin 62 interconnecting a first hinge panel 64 secured to the bezel 54 and a second hinge panel 66 fixedly secured to the outer wall 38 of movable enclosure 36 so that it bears against the outer wall 38 of the movable enclosure 36 and the bezel 54, respectively, so as to cause the closure panel 48 to be maintained in its closed position as illustrated in FIGURE 4.

Another feature of the invention is that the movable enclosure 36 is movable exteriorly of the door 14 into an open position as illustrated in FIGURE 2 by grasping a horizontally extending full-width handle 68 directed across the top of the front outer wall 38 and moving the enclosure 36 downwardly and outwardly of the door 14 as illustrated in dotted lines in FIGURE 4 about a lower, horizontally arranged pivot assembly 70. The pivot assembly 70, more specifically is arranged within a recess 72 formed across a lower portion of the door 14 where the outer housing wall 16 of the door supports a first sleeve bearing 74 at one end of recess 72 and a second sleeve bearing 76 at the opposite end of the recess 72. Each of the sleeve bearings 74, 76, in turn, supportingly receives a pivot pin 78, 80, respectively, with each of the pivot pins 78, 80 having one end thereof directed into the recess 72 to be threadably connected to a downwardly depending flange portion 82 on the outer face of the movable enclosure 36 as best illustrated in FIGURE 5. By virtue of the above-described hinge assembly, the enclosure 36 is guided from a vertically disposed closed position to a horizontally disposed open position, best illustrated in FIGURE 2.

Operatively associated with the hinge assembly 70 is an elongated torsion spring 84 directed through the depending flange 82 and having one end 86 thereof in interlocking relationship therewith and an opposite end 88 thereof directed through the outer wall 16 to be in interlocking engagement with the door 14 whereby, on opening movement of the movable enclosure 36, the torsion spring 84 acts to cushion the movement and also serves as a counterbalancing element to aid in closing the movable enclosure 36.

When the enclosure 36 is in a closed position, best illustrated in FIGURE 4, it serves to completely close the opening 32 through the door 14 and in conjunction with the door serves to form part of the thermal insulating section between the main food storage compartment 20 and the air surrounding the cabinet 10. Additionally, the movable enclosure 36 has a peripheral flange 90 spaced from and overlapping the outward facing surface of the recessed lip 34 continuously therearound serving to support a bellows-type sealing element 92 of a suitable resilient material and to locate the bellows seal element in sealing engagement with the lip 34 to prevent fluid leakage exteriorly of the main food storage compartment 20 through the opening 32 in door 14.

Another important feature of the present invention is that when the movable enclosure 36 is moved into its opened horizontal disposition, best illustrated in FIGURE 2, the closure panel 48 may be moved upwardly about the pivot pin 62 by releasing a closure panel engaging latch (not shown) by upward movement of a handle 94 located on the outer housing wall 38 on top of the enclosure 36 when it is in its closed position. Thus, substantially the full planar extent of the secondary food storage compartment 42 is readily accessible to a refrigerator user at a level that does not require stooping or bending. Furthermore, when the user desires to gain access to the secondary food storage compartment, only a small portion of the main food storage compartment 20 is opened to the surrounding air as compared to opening the door 14 of the refrigerator and, consequently, there is only a limited convective interchange between the compartment 20 and the surrounding ambient environment. As a result, less cooling capacity is required to maintain the compartment 20 at a desired temperature.

While the embodiment of the present invention as herein disclosed constitutes a preferred form, it is to be understood that other forms might be adopted.

What is claimed is as follows:

1. In a refrigerating apparatus comprising the combination of, a cabinet, wall means forming a first food storage compartment within said cabinet, means forming an access opening in said wall means to said first food storage compartment, a door for closing said cabinet access opening, means forming an opening in said door, a movable closed container forming a second high humidity food storage compartment separate from said first food storage compartment, means forming an access opening in said container to said second compartment, a pivotable door for closing the opening to said second compartment, said movable container serving to close said door opening when in a first position, means for pivotally supporting said door upon said cabinet for movement relative thereto into open and closed positions about a first axis, and means for pivotally mounting said movable container on said door for movement downwardly and outwardly thereof for providing access to said second food storage compartment when said door is in either its closed or open position, said pivotable container door being movable upwardly to close said cabinet door opening when said container is in its open position for blocking the escape of cold air from said first food storage compartment.

2. In the combination of claim 1, said means for pivoting said movable container on said door including a horizontally directed pivot pin for guiding said movable container into a horizontal disposition, said access opening to said second high humidity food storage compartment being located in a readily accessible horizontal plane when said movable container assumes its lowermost, outward position.

3. In a refrigerating apparatus comprising the combination of, a cabinet, said cabinet having an outer housing and an inner liner spaced from said housing forming walls of a first food storage compartment within said cabinet, insulating material in the space between said fixed cabinet outer housing and the inner liner thereof, means forming an access opening in said outer housing and inner liner of said fixed cabinet into said first food storage compartment, a door for closing said access opening, means forming an opening in said door, means for closing said door opening including a movable closed container having an outer housing and an inner liner spaced therefrom for forming a second high humidity food storage compartment separate from said first compartment, means for providing an access opening into said second high humidity food storage compartment, a second door pivoted on said container for closing said access opening into said second food storage compartment for preventing evaporation of moisture therefrom into said first food storage compartment, means for pivotally mounting said door on said cabinet for movement outwardly therefrom into an open position about a first axis, means for pivotally mounting said movable container on said door for movement outwardly thereof about an axis substantially perpendicular to said first axis and downwardly into a horizontal disposition wherein said access opening into said second high humidity food storage compartment is accessible without opening said door and when accessible is located in a horizontal planar disposition for ease in loading and unloading articles to and from said second high humidity food storage compartment, said second door being movable upwardly into a position for closing said refrigerator door opening when the container is in its open position to prevent the escape of cold air from said first food storage compartment.

4. In a refrigerating apparatus comprising the combination of, a cabinet, wall means forming a first food storage compartment within said cabinet, means forming an access opening in said cabinet wall means to said first food storage compartment, a door for closing said cabinet access opening, hinge means for pivoting said door outwardly of said cabinet about a first axis into an open position, means forming an opening in said door, a movable closed food storage container including wall means forming a second high humidity food storage compartment separate from said first food storage compartment, said movable food storage container being located within the opening in said refrigerator cabinet door and having a peripheral flange thereon spaced outwardly of said door, seal means supported on said peripheral flange for sealingly engaging said door around the opening therein for preventing fluid leakage exteriorly of said first food storage compartment through the opening in said first food storage compartment door, means for pivotally securing said movable container to said door for outward and downward movement relative thereto about an axis substantially perpendicular to the pivot axis of said door.

5. In the combination of claim 5, means interconnected between said cabinet door and said movable compartment including a torsion spring having one end thereof secured to said movable container and another end fixedly secured to a portion of said door whereby upon outward and downward movement of said movable compartment said spring cushions such movement and counterbalances the weight of said movable container to assist in movement thereof into a closed position.

References Cited by the Examiner
UNITED STATES PATENTS

| | | | |
|---|---|---|---|
| 2,044,881 | 6/1936 | Hartbauer | 20—35 |
| 2,046,909 | 7/1936 | Terry | 62—377 |
| 2,122,680 | 7/1938 | Dart | 62—377 |
| 2,136,558 | 11/1938 | Manshel | 62—377 |
| 2,155,967 | 4/1939 | Carroll | 20—35 |
| 2,656,688 | 10/1953 | Hinkel | 20—35 |

FRANK B. SHERRY, *Primary Examiner.*

EDWARD J. MICHAEL, *Examiner.*